United States Patent [19]

Zacchio

[11] Patent Number: 4,566,321

[45] Date of Patent: Jan. 28, 1986

[54] MICROWAVE TANK-CONTENTS LEVEL MEASURING ASSEMBLY WITH LENS-OBTURATED WALL-OPENING

[75] Inventor: Joseph M. Zacchio, Wethersfield, Conn.

[73] Assignee: Transamerica Delaval Inc., Princeton, N.J.

[21] Appl. No.: 692,576

[22] Filed: Jan. 18, 1985

[51] Int. Cl.⁴ .................... G01F 23/28; G01S 13/08
[52] U.S. Cl. ...................... 73/290 R; 73/290 V; 324/58.5 B; 343/12 R; 343/753
[58] Field of Search ............... 73/290 V; 324/58.5 B, 324/58.5 A; 343/717, 784, 753, 12 R

[56] References Cited

U.S. PATENT DOCUMENTS

| | | | |
|---|---|---|---|
| 2,801,412 | 7/1957 | Maybury et al. | 343/753 |
| 2,994,873 | 8/1961 | Goubau | 343/753 |
| 3,727,897 | 4/1973 | Bennett | 343/12 R X |
| 3,833,906 | 9/1974 | Augustine | 343/784 X |
| 4,044,355 | 8/1977 | Edvardsson | 343/14 |

FOREIGN PATENT DOCUMENTS 1193577  6/1970  United Kingdom .......... 324/58.5 R

*Primary Examiner*—Daniel M. Yasich
*Attorney, Agent, or Firm*—Hopgood, Calimafde, Kalil, Blaustein & Judlowe

[57] ABSTRACT

A microwave tank-contents level measuring system is housed within a housing having an open end obturated by a hyperbolically curved convex-plano fluid impermeable solid dielectric lens providing a seal for the tank opening over which the housing is installed while collimating the outgoing ranging signal and focusing the return signal. A separate removable housing cover provides access to the electronic components for service while the tank-opening sealing function of the lens is not disturbed. A transmitting-receiving horn is dimensioned and positioned on the axis of the lens with its effective phase center at the operating frequency coinciding with a focal point of the hyperbolic surface.

12 Claims, 6 Drawing Figures

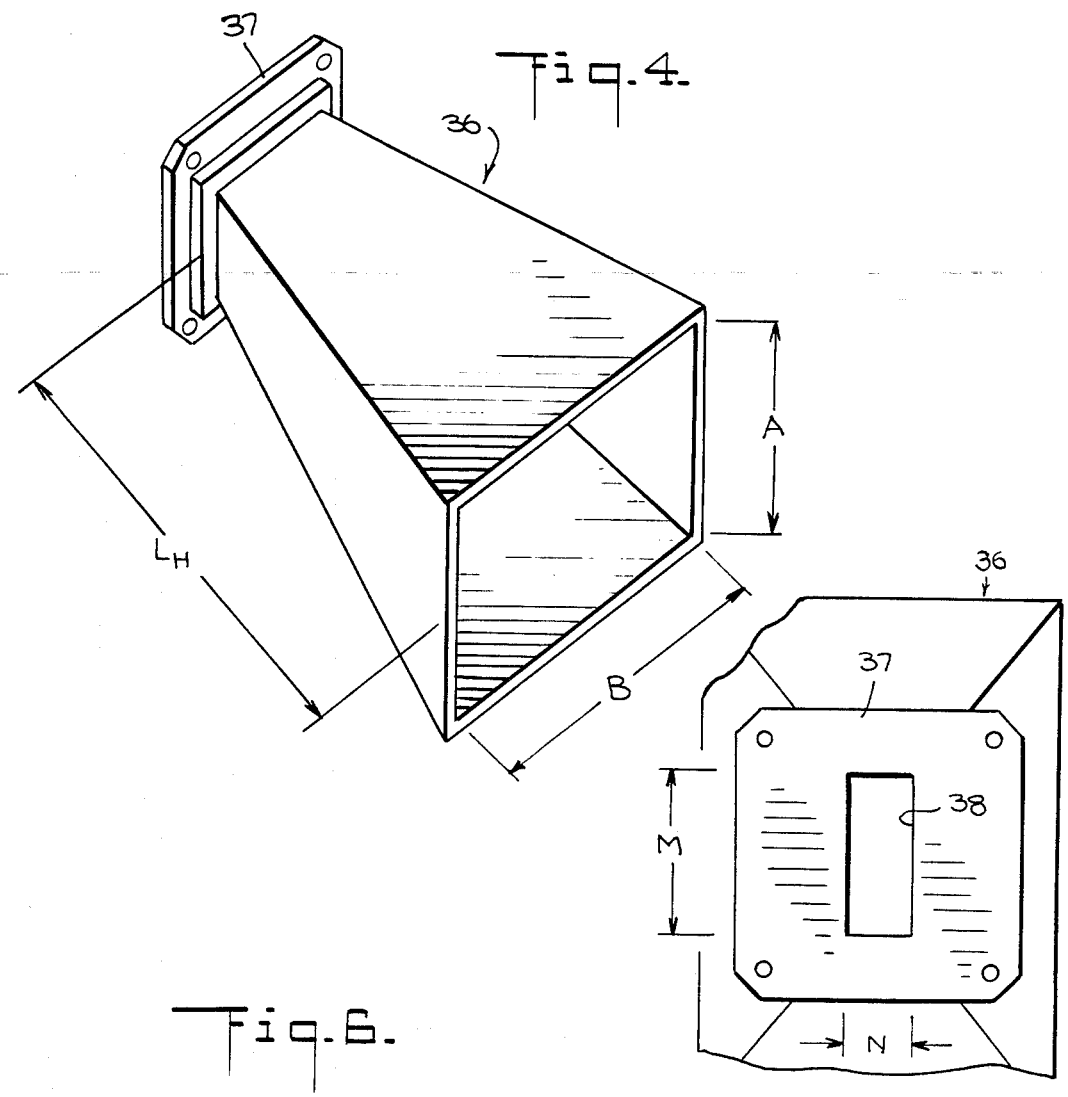
Fig. 4.
Fig. 5.
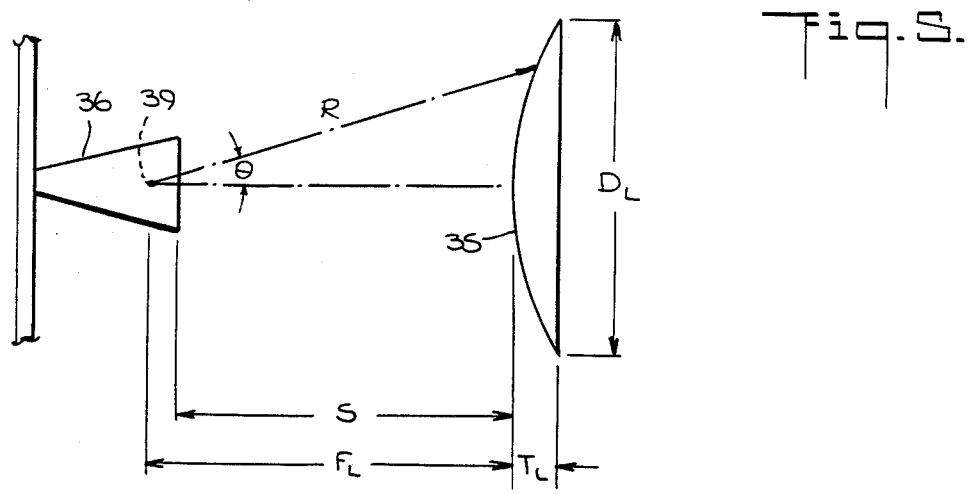
Fig. 6.

4,566,321

MICROWAVE TANK-CONTENTS LEVEL MEASURING ASSEMBLY WITH LENS-OBTURATED WALL-OPENING

BACKGROUND OF THE INVENTION

The present invention relates to microwave tank-contents level measuring systems, and more particularly to the assemby to be mounted and to its mounting on the exterior of a tank over an opening in the tank top wall.

In U.S. Pat. No. 4,044,355, issued Aug. 23, 1977, there is described a microwave based system for measuring the contents of tanks, such as oil or the like in the tanks of a tanker vessel. A source of microwave energy is mounted externally over an opening at the highest point in the tank. The assemably is illustrated and described as consisting of an upright tubular capsule [housing], in the upper portion of which is mounted a bowl-shaped downwardly concave antenna. A smaller tubular capsule [housing], mounted horizontally on one side of the first capsule, houses a microwave generator and mixers. A waveguide projects from the generator and mixers into the upright larger capsule and carries at its inner end a microwave horn spaced below and coaxial with the antenna. The horn is directed upwardly illuminating the antenna which radiates a signal downwardly toward the surface whose level is to be determined. Returning echo signals are collected by the antenna and directed back to the horn and then to the mixers for processing and determination of the level of the tank contents. Access or service covers are located above the upright capsule and at the free end of the horizontal capsule. Details are presented for the electronics required to complete the system, but because the electronics constitute no part of the present invention, they will not be discussed further.

As mentioned above, the source of microwave energy is mounted externally over an opening in the tank. That is, the bottom of the upright capsule is provided with a flange for joining the assembly to the exterior of a tank top. As shown in the patent drawings, the upright capsule is cylindrical with its bottom end completely open and mounted over a circular opening in the tank wall which opening has a diameter slightly smaller than that of the upright capsule.

The aforesaid patented apparatus has a serious drawback. When the measuring assembly is mounted on a tank, the entire interiors of the capsules and their contents are exposed to the atmosphere present in the tank. The fumes from crude oil or other petroleum products can be corrosive and attack the components of the system. More significantly, these fumes can be explosive and create a dangerous condition when an access cover must be removed to service the internal equipment. Other liquids can pose similar hazzards. Therefore, there are many liquids with which the apparatus described in said patent cannot be used; and this impediment is generally present just where a non-invasive measuring system is required.

SUMMARY OF THE PRESENT INVENTION

With the above mentioned problem in mind, it is an object of the present invention to provide a non-invasive microwave tank-contents level measuring assembly that when installed is isolated from the contents of the tank.

It is a further object of the present invention to provide the mentioned isolation while enhancing the accuracy of the subject measuring system, and avoiding interference with communication between assembly and tank of the ranging signal.

In accordance with the present invention there is provided a microwave tank-contents level measuring assembly comprising in combination a housing, a microwave transmitter-receiver system coupled to a horn radiator-receptor for emitting a microwave ranging signal to be reflected from the surface of the tank-contents for detection and level determination, said housing having a wall with an opening, said system and horn being mounted within said housing for transmitting and receiving said ranging signal through said wall opening, a dielectric microwave lens, impermeable to fluid, disposed over said opening and joined to said housing with at least a fluid-tight seal, said lens being constructed to collimate said ranging signal during its outward passage and to focus said ranging signal, on its return passage, at a point substantially coincident with the effective phase center of said horn, and means for securing said housing with said lens-obturated wall-opening over an opening in a top wall of a tank with said lens establishing at least a fluid-tight seal over said tank opening.

BRIEF DESCRIPTION OF THE DRAWINGS

The invention will be better understood after reading the following detailed description of the presently preferred embodiment thereof with reference to the appended drawings in which:

FIG. 4 is a perspective view, somewhat diagrammatic, of the microwave radiating horn and mounting flange incorporated in the assembly shown in detail in FIG. 2;

FIG. 5 is a view of the rear of the mounting flange as seen in FIG. 4 showing the aperture therein; and FIG. 6 is a diagrammatic illustration for showing the relationship between the microwave horn and the dielectric lens forming an essential part of the apparatus of FIG. 2.

The same reference numerals are used throughout the various figures of the drawings to designate the same or similar parts.

DETAILED DESCRIPTION OF THE PRESENTLY PREFERRED EMBODIMENT

Figure 1:
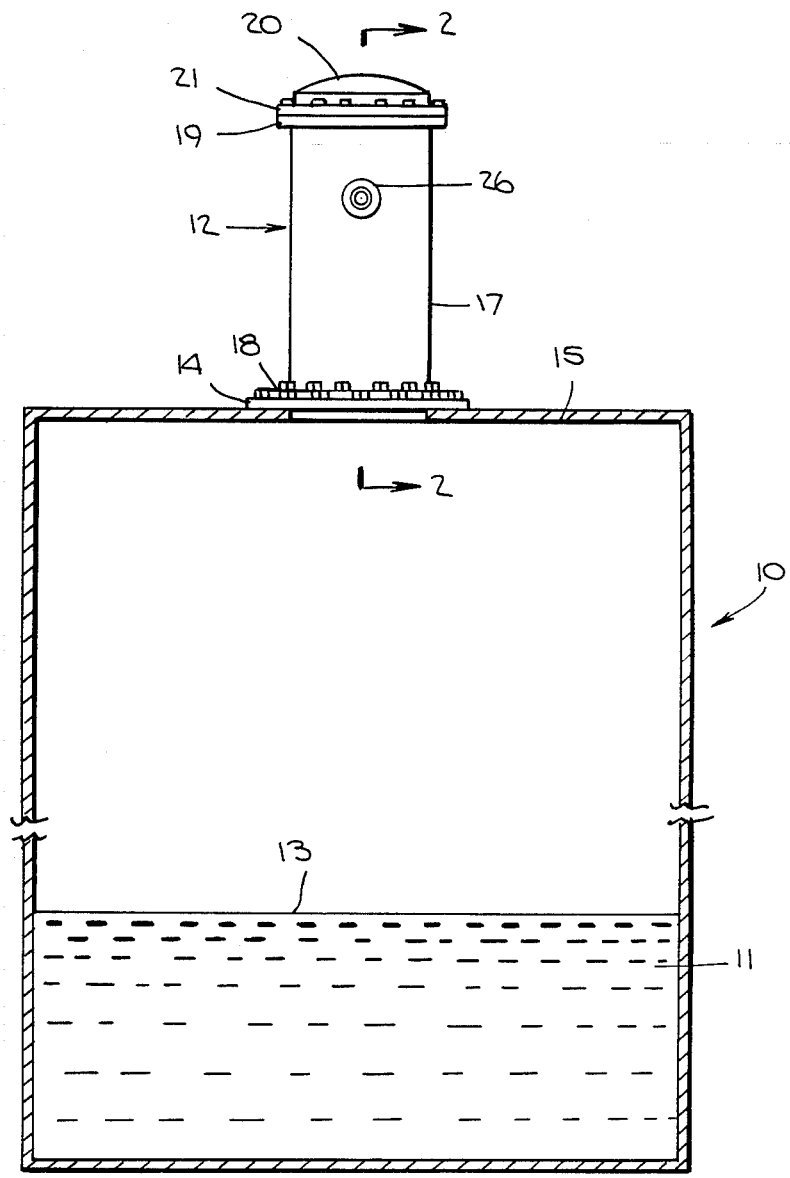
FIG. 1 is a diagrammatic illustration of a microwave level measuring assembly embodying the present invention and mounted on the top of a tank containing a liquid whose level is to be determined.

Referring to FIG. 1, the reference numeral 10 designates generally a tank that might be located in a marine vessel or elsewhere whose contents 11 is to be measured by a non-invasive microwave measuring assembly or device designated generally by the reference numeral 12. As shown, the measuring assembly 12 is flange mounted on the top of the tank 10. In operation, the assembly 12 will project a ranging signal downwardly to the surface 13 of the liquid 11 where it is reflected back to the assembly 12 for processing and level determination. Generally, such systems employ a frequency modulated carrier signal with the reflected signal being compared to a locally produced reference signal such that the frequency difference is indicative of the distance from the measuring assembly 12 to the surface 13 of the liquid 11.

Figure 2:
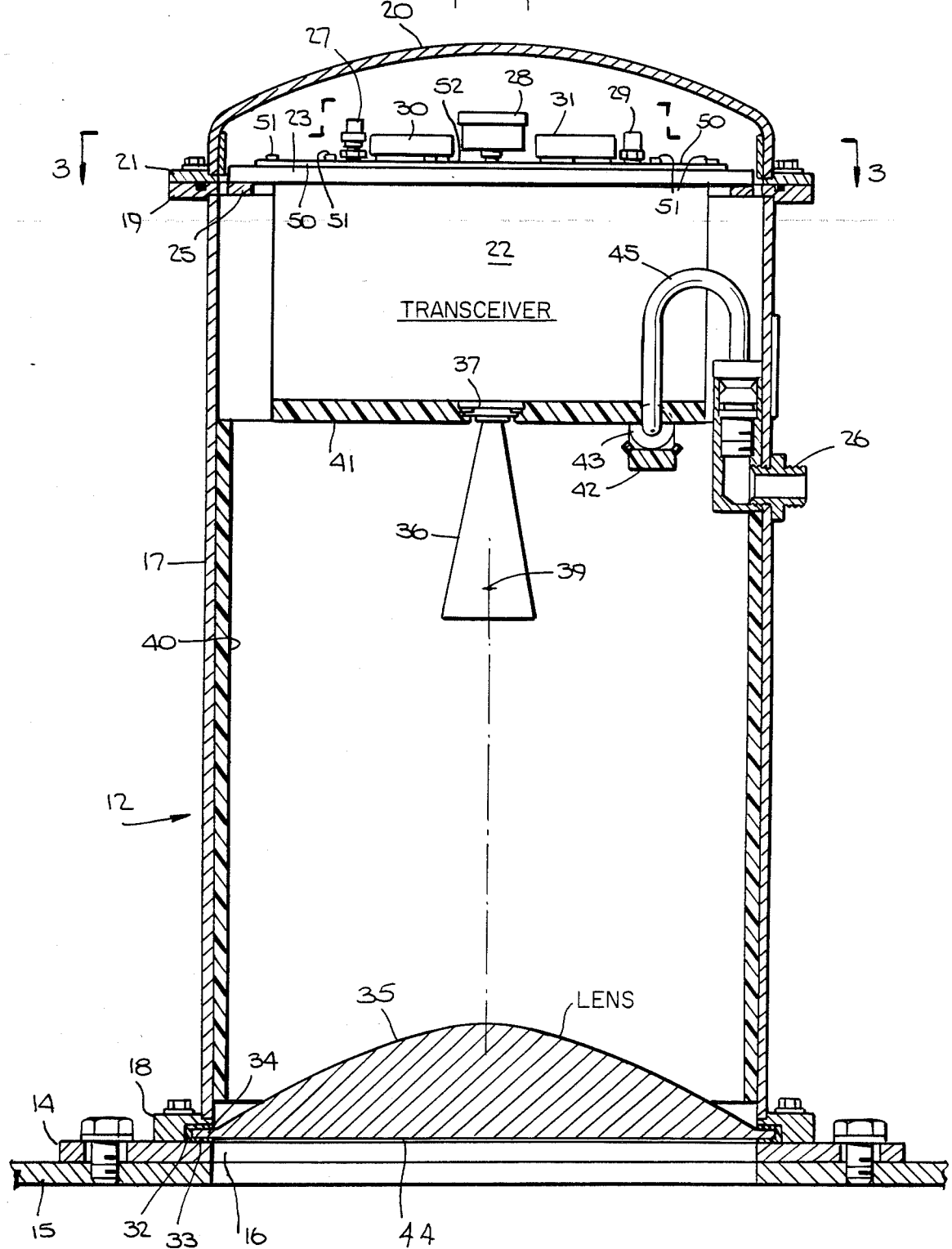
FIG. 2 is a vertical sectional view taken along the line 2—2 of the assembly in FIG. 1.
Figure 3:
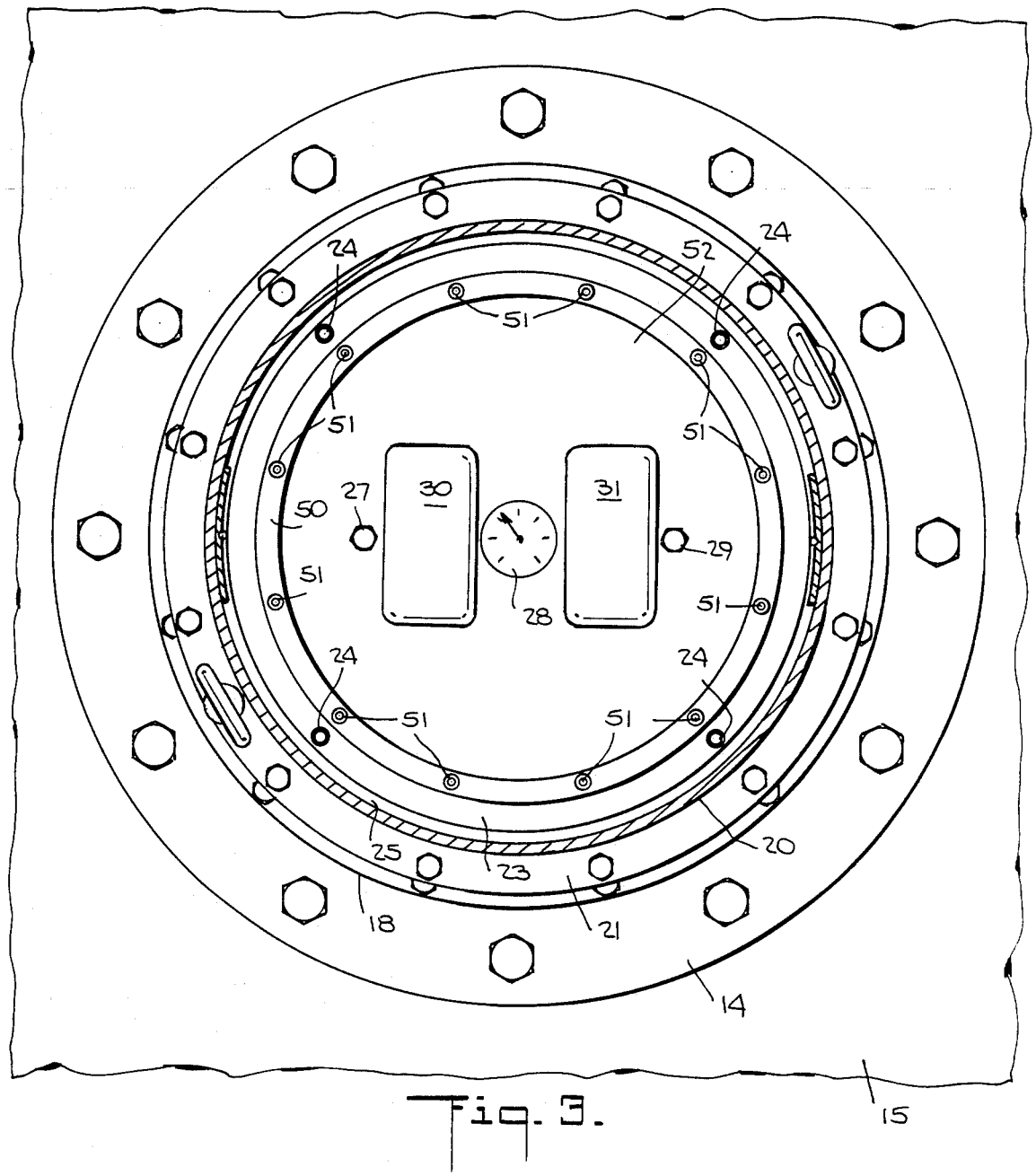
FIG. 3 is a transverse sectional view taken along the line 3—3 in FIG. 2.

Referring now to FIGS. 2 and 3, in addition to FIG. 1, the measuring assembly 12 is seen as having a flange ring 14 having a radially outer circle of bolt holes for receiving bolts to attach the flange 14 to the top wall 15 of the tank 10. The flange ring 14 has a central opening 16 which is placed over and in registration with a corresponding opening (not shown) in the top wall 15 of the tank 10.

The rest of the assembly includes a housing for the level measuring equipment consisting of a cylindrical body section 17 having a flange 18 at its lower end by which it is joined to the flange ring 14, and having another flange 19 at its upper end to which is separably bolted a housing cover 20 by means of its associated flange 21. The microwave transmitter-receiver system comprising generator and receiver apparatus (not shown) is contained within the enclosure 22. The latter is suspended by a flange 50 from a circular flange ring 23, the latter being secured by screws 24 (best seen in FIG. 3) to an internally extending flange portion 25 formed integral with the flange 19. Screws 51 fasten flange 50 to ring 23. External electrical connections are effected to the assembly 12 through a conventional fitting 26 that communicate via a cable section 45 with the equipment in enclosure 22.

It is desirable to maintain the contents of the enclosure 22 in an inert nitrogen atmosphere. For this purpose an inlet valve 27 and a pressure gauge 28 are mounted on the top wall 52 of enclosure 22. In order to permit service of the equipment within the enclosure 22, there is also provided a pressure relief valve 29 for venting the nitrogen that is normally maintained at a pressure of about 15 psi.

In order to avoid the presence of free moisture within the housing 17, 20, desiccant containers 30 and 31 are mounted by suitable adhesive upon the top wall 52.

Across the bottom opening of the cylindrical section 17 of the housing, mounted within a rabbet 32 within the flange 18 with a channel gasket 33 surrounding its radially projecting flange portion 34 is a dielectric fluid impermeable microwave lens 35. When the flange 18 is properly bolted to the flange 14 the gasket 33 will establish, dependent upon the material of the gasket, at least a fluid-tight seal between the radial flange portion 34 of the lens 35 and the adjacent components of the assembly 12 within the rabbet 32. Thus, when the flange 14 is properly bolted and sealed to the top of the tank 10, with the interposition of any suitable seal, the flange 14 in cooperation with the lens 35 will establish at least a fluid-tight cover over the opening in the tank 10. However, by removing the top cover 20 of the assembly 12, all of the electronic components are accessible for service without disrupting the seal over the tank opening provided by the lens 35.

The microwave energy is communicated from and to the equipment within the enclosure 22 by means of a horn radiator-receptor 36 secured to the end of a waveguide (not shown) by means of a standard horn mounting flange 37 having a rectangular aperture 38 (best seen in FIG. 5) providing the transition between the internal waveguide and the horn 36. The present system preferably operates at 10 GHz. At that operating frequency the rectangular aperture 38 should have a width $N = 0.400''$ and a length $M = 0.900''$. In order to cooperate properly with the lens 35, the horn 36 should have a length $L_H = 5''$; a height $A = 2.200''$; and a width $B = 2.900''$.

The dimensions A and B are measured between the interior surfaces of the horn walls, which walls have a thickness of about 1/16". At the flange 37 the horn walls border the aperture 38. The angle of divergence of the broader horn walls from the horn axis is 10°12′, while the divergence of the narrower horn walls from the horn axis is 11°18′.

The lens 35 may be constructed of a polyester resin material. It should be solid and free of any voids or discontinuities that would restrict or distort microwave transconductance. It has been found that a satisfactory plano-convex lens configuration with the convex surface defined as the surface obtained by rotating a hyperbola about its axis (a spherical hyperbola), said surface facing into the assembly 12, as shown, can be fabricated from a polyester-hardener casting composition that yields a dielectric having a relative dielectric constant, of approximately 2.83.

Referring to FIGS. 2 and 6, with the housing section 17 having an outside diameter of approximately 14", the diameter of the effective portion of the lens 35, corresponding to the diameter of the aperture 16 in flange 14, is $D_L = 13.5''$. This is the extent of the convex curved surface. The flat flange portion 34 has a width of 17/32" such that the overall diameter of the lens is 14 9/16". The thickness, $T_L$ of the lens is equal to 2.425". The distance between the point on the convex surface of the lens 35, on the lens axis, to the plane containing the leading edge of the horn 36 is $S = 10.1625''$. The effective phase center of the horn 36, and focal point of the lens 35, is located at 39, a distance $F_L = 10.51463''$ from the convex surface of the lens along the lens axis. The hyperbolic surface of the convex side of the lens 35 can be calculated using the equation $R = (\sqrt{\epsilon_r} - 1)F_L/(\sqrt{\epsilon_r} \cos\theta) - 1$, where R is the polar coordinate radius from the lens focal point 39 on the convex side to a point on the convex surface, $\epsilon_r$ is the relative dielectric constant of the lens material at the operating frequency, $F_L$ is the focal length from said focal point along the lens axis to said convex surface, and $\theta$ is the polar coordinate angle of said radius as measured from the lens axis.

Finally, in order to reduce internal reflections, the housing section 17 is lined with a high density conductive foam plastic 40. The bottom surface of the enclosure 22 is similarly covered with a layer of the same high density conductive foam plastic 41, and such plastic is also added at 42 to the exposed surface of the electrical fitting 43.

The lens 35 should be solid with no air pockets or voids. Optionally, it may be coated, particularly on its plano surface 44 with a chemically resistant dielectric coating, e.g., one of the fluorocarbon resins, if the resin material of the lens proper would be subject to chemical attack by the contents of the tank on which the measuring apparatus is to be mounted. An extremely thin layer of such coating, only thick enough to maintain its integrity as a chemical barrier, and essentially transparent to microwave energy, should be used so as to have negligible effect upon the refractive qualities of the lens.

In operation, the lens 35 will provide a lens-obturated wall opening, sealing the opening, functioning to collimate the ranging signal during its outward passage and to focus said ranging signal on its return passage at the point 39 substantially coincident with the effective phase center of the horn 36. A lens constructed as described above will provide an extremely narrow beam of radiant energy with negligible side lobes. This is important in order to minimize interfering signals being reflected from various structural members within a tank as opposed to the desired reflection from the surface of the tank content or liquid.

The above-described embodiment assumes a fixed relationship between lens and horn radiator with the horn being positioned co-axially on the lens axis. However, under certain conditions it may be desirable to have the capability of aiming the ranging signal slightly off axis, and this can be accomplished by providing for positioning the horn radiator-receptor slightly to one side of the lens axis in any known manner.

Having described the presently preferred embodiment of the invention, it will be apparent to those skilled in the subject art that various changes in construction may be introduced without departing from the true spirit of the invention as defined in the appended claims. For example, other known dielectric materials such as an epoxy, polystyrene, or the like, can be substituted for the polyester in producing the lens. If the dielectric constant is different, the equation set forth above can be used to calculate the required curvature of the convex surface. If desired, other known lens configurations can be employed.

What is claimed is:

1. A microwave tank-contents level measuring assembly comprising in combination a housing, a microwave transmitter-receiver system coupled to a horn radiator-receptor for emitting a microwave preselected ranging signal to be reflected from the surface of the tank-contents for detection and level determination, said housing having a wall with an opening, said system and horn being mounted within said housing for transmitting and receiving said ranging signal through said wall opening, a dielectric microwave lens, impermeable to fluid, disposed over said opening and joined to said housing with at least a fluid-tight seal, said lens being geometrically shaped and constructed so as to collimate said preselected ranging signal during its outward passage and, on the return passage, to focus said preselected ranging signal at a point substantially coincident with the effective phase center of said horn, and means for securing said housing with said lens-obturated wall-opening over an opening in a top wall of a tank with said lens establishing at least a fluid-tight seal over said tank opening whereby the level of any contents of the tank is monitored by the measuring assembly.

2. A microwave tank-contents level measuring assembly according to claim 1, characterized in that said housing has a removable cover over another opening in its walls for permitting access to and service of said microwave system without removing said lens from over said tank opening.

3. A microwave tank-contents level measuring assembly according to claim 2, characterized in that said lens is planoconvex with its convex surface defined as the surface obtained by rotating a hyperbola about its axis, said surface facing into said housing, and said horn has a radiation axis positioned colinearly with the optical axis of said lens.

4. A microwave tank-contents level measuring assembly according to claim 3, characterized in that said convex surface is defined by the equation: $R=(\sqrt{\epsilon_r}-1)F_L/(\sqrt{\epsilon_r}\cos\theta)-1$, where R is the polar coordinate radius from the lens focal point on the convex side to a point on the convex surface, $\epsilon_r$ is the relative dielectric constant of the lens material at the operating frequency, $F_L$ is the focal length from said focal point along the lens axis to said convex surface, and $\theta$ is the polar coordinate angle of said radius as measured from the lens axis.

5. A microwave tank-contents level measuring assembly according to claim 4, characterized in that $\epsilon_r$ is about 2.83 at 10 GHz.

6. A microwave tank-contents level measuring assembly according to claim 5, characterized in that said lens is formed from solid polyester resin and is coated at least on its plano surface with a thin layer of a chemically resistant dielectric material, essentially transparent to microwave energy but different from said lens resin.

7. A microwave tank-contents level measuring assembly according to claim 1, characterized in that said lens is planoconvex with its convex surface defined as the surface obtained by rotating a hyperbola about its axis, said surface facing into said housing, and said horn has a radiation axis positioned colinearly with the optical axis of said lens.

8. A microwave tank-contents level measuring assembly according to claim 7, characterized in that said convex surface is defined by the equation: $R=(\sqrt{\epsilon_r}-1)F_L/(\sqrt{\epsilon_r}\cos\theta)-1$, where R is the polar coordinate radius from the lens focal point on the convex side to a point on the convex surface, $\epsilon_r$ is the relative dielectric constant of the lens material at the operating frequency, $F_L$ is the focal length from said focal point along the lens axis to said convex surface, and $\theta$ is the polar coordinate angle of said radius as measured from the lens axis.

9. A microwave tank-contents level measuring assembly according to claim 8, characterized in that $\epsilon_r$ is about 2.83 at 10 GHz.

10. A microwave tank-contents level measuring assembly according to claim 9, characterized in that said lens is formed from solid polyester resin and is coated at least on its plano surface with a thin layer of a chemically resistant dielectric material, essentially transparent to microwave energy but different from said lens resin.

11. A microwave tank-contents level measuring assembly according to claim 1, characterized in that said dielectric lens has a relative dielectric constant at 10 GHz of about 2.83.

12. A microwave tank-contents level measuring assembly according to claim 11, characterized in that said lens is formed from solid polyester resin and is coated at least on its plano surface with a thin layer of a chemically resistant dielectric material, essentially transparent to microwave energy but different from said lens resin.

* * * * *